Figure 1:
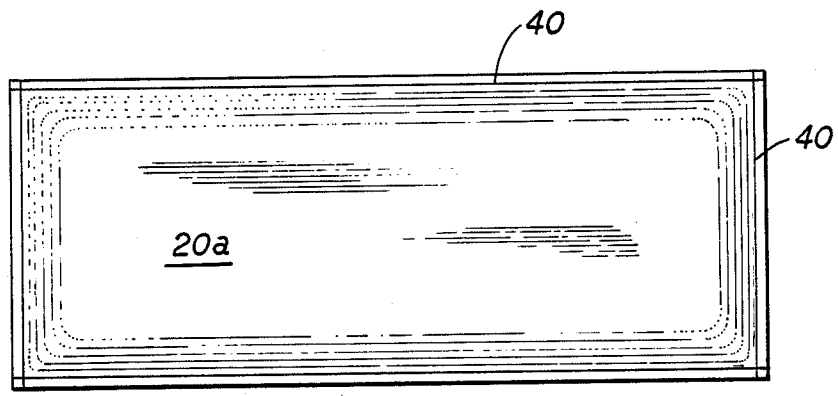

United States Patent [19]

Herringer

[11] Patent Number: 4,831,010

[45] Date of Patent: May 16, 1989

[54] ABSORBENT SACK FOR CLEANING UP AND CONTAINING LIQUID SPILLS

[76] Inventor: Karl Herringer, 406 Ohio St., Gridley, Calif. 95948

[21] Appl. No.: 180,532

[22] Filed: Apr. 12, 1988

[51] Int. Cl.$^4$ .............................................. B01J 20/10
[52] U.S. Cl. .................................. 502/407; 502/400; 502/413; 502/527
[58] Field of Search ................ 502/407, 413, 400, 527

[56] References Cited

U.S. PATENT DOCUMENTS 4,460,292  7/1984  Durham et al. ...................... 405/129
4,676,907  6/1987  Harrison .......................... 502/413 X

OTHER PUBLICATIONS

"Rental News", Shop Sox, Nov. 1987, p. 68.
"Turnkey Material Handling", Sorbent Pillow, Jan. 1988, p. 70.
"Garon", Sorbent Coil, Pads & Rug, Summer/Fall 1988, p. 10.

*Primary Examiner*—Patrick P. Garvin

[57] ABSTRACT

A product for performing tasks of absorbing and containing oils and liquids, being a sack of nonwoven textile, fully enclosed, containing absorbent material which is rice hull ash, a waste product of a co-generation plant.

Advantages of product are two fold: a waste material is used as a component and can be used to pick up and contain hazardous waste spills.

1 Claim, 1 Drawing Sheet

ABSORBENT SACK FOR CLEANING UP AND CONTAINING LIQUID SPILLS

BACKGROUND

1. Field of Invention

This invention relates to absorption products for cleaning up and containing spills and leaks of oil and other liquids. 2. Description of Prior Art Many manufacturers, distributors and other consumers have a need for a product to clean up and contain liquid spills and leaks.

Heretofore a variety of products have been used with absorption abilities.

One such product is a fabric sock filled with cellulose. This product is limited by its size and shape.

Another product is an absorbent pillow filled with foamed silicate glass. This product is limited by its absorption rate.

Most consumers therefore would find it desirable to have a product that is sufficient in size and superior in absorption capacity.

OBJECTS AND ADVANTAGES

Accordingly I claim the following as my objects and advantages of the invention: to provide a product for clean up of spills and leaks of oil and liquids, to provide a product that will be easy to use and dispose of. Whereas other methods of completing this task is to sprinkle absorbent material on spill and sweep up.

In addition I claim that my invention may be used to absorb and contain hazardous waste and solidify it for disposal.

I further claim that my invention is very useful, as one of its components is rice hull ash, a waste product from a co-generation plant.

Therefore I claim it's twofold advantage because it finds a use for a waste product and helps to control hazardous waste and improve our environment.

I also claim it to be safe and easy to use as the absorbent material is enclosed in the sack so there is no problem of scattering contaminants. The non-woven textile prevents the rice hull ash particles from coming through the fibers.

Readers will find further objects and advantages of the invention from a consideration of the ensuing description and drawings.

DRAWINGS FIGURES

Figure 2:
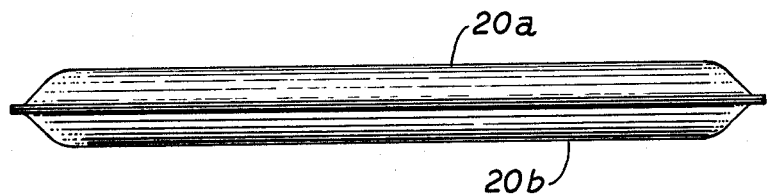
Figure 3:
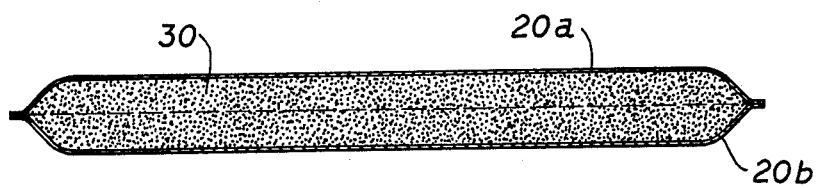

FIG. 1 shows a top view of the invention.
FIG. 2 is a sideview of the invention.
FIG. 3 shows a sectional side view of the invention indicating contents of the sack.

Drawing reference Numerals:
20a—top of textile sack
20b—bottom of textile sack
30—absorbent material
40—sealing lines

INVENTION DESCRIPTION

FIG. 1 shows a rectangular shaped sack closed on all four sides, made of non-woven textile.
FIG. 2 shows a sideview of the sack.
FIG. 3 shows a side view indicating the contents as rice hull ash.

INVENTION OPERATION

The invention will perform many useful tasks of absorption.

For cleaning spills, place a sack on top of liquid. Leave until absorbed. Turn sack over if necessary.

To contain large spills place a series of sacks around perimeter of spill. Then place sack directly on liquid for final cleanup.

To catch a stream of oil or liquid, place a sack under drip.

To control oil dripping under work bench or machinery lay sack flat or drape around legs or obstruction.

Sack may be reused until full saturation point is reached. Shake sack to distribute liquid and use again.

Used product is easy to dispose of as the absorbent material in the sack contains and controls the liquid.

While the above description contains many specifics, the reader should not construe these as limitations on the scope of the invention, but exemplifications of preferred embodiments thereof. Those skilled in the art will envision many other possible variations are within its scope. For example, skilled artisans will readily be able to change the dimensions and shapes of the embodiment. The product could be in a blanket form to control larger spills. As an alternative, it could be made in a circular form to accomodate barrels and other containers.

I claim:
1. A product for absorbing and containing liquid spills comprising:
  (a) a sack of nonwoven textile, enclosed on all four sides, containing
  (b) an absorbent, rice hull ash.

* * * * *